United States Patent
Ji et al.

(10) Patent No.: US 9,125,217 B2
(45) Date of Patent: Sep. 1, 2015

(54) BLANK SUBFRAME UPLINK DESIGN

(71) Applicant: QUALCOMM Incorporated, San Diego, CA (US)

(72) Inventors: Tingfang Ji, San Digeo, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/490,191

(22) Filed: Sep. 18, 2014

(65) Prior Publication Data

US 2015/0003399 A1    Jan. 1, 2015

Related U.S. Application Data

(63) Continuation of application No. 12/626,236, filed on Nov. 25, 2009, now Pat. No. 8,879,461.

(60) Provisional application No. 61/118,891, filed on Dec. 1, 2008.

(51) Int. Cl.
*H04W 72/04* (2009.01)
*H04W 72/08* (2009.01)
(Continued)

(52) U.S. Cl.
CPC ........ *H04W 72/082* (2013.01); *H04W 74/0866* (2013.01); *H04B 7/2606* (2013.01); *H04W 84/047* (2013.01)

(58) Field of Classification Search
CPC .......... H04W 72/082; H04W 74/0866; H04W 7/2606; H04W 84/047
See application file for complete search history.

(56) References Cited

U.S. PATENT DOCUMENTS 5,633,893 A    5/1997    Lampe et al.

6,009,132 A    12/1999    Scholtz
(Continued)

FOREIGN PATENT DOCUMENTS

CN    101292562 A    10/2008
EP    1881714 A1    1/2008
(Continued)

OTHER PUBLICATIONS

3GPP: "3GPP TS 36.211 V8.4.0 (Sep. 2008); 3rd Generation Partnership Project; Technical Specification Group Radio Access Network; Evolved Univeral Terrestrial Radio Access (E-UTRA); Physical Channels and Modulation (Release 8); pp. 1-5 and 31-36," 3GPP, Sep. 24, 2008.
(Continued)

*Primary Examiner* — Jay P Patel
(74) *Attorney, Agent, or Firm* — Nerrie M. Zohn

(57) ABSTRACT

Blank subframe link design uses reduced bandwidth either explicit or derived for Closed Subscriber Group (CSG) cell interference mitigation, enabling a non-allowed User Equipment (UE) to co-exist with CSG cells on the same carrier. One could specify UL blank subframes to orthogonalize non-allowed UE and allowed UE transmissions on UL either via explicit UL blank subframe definition or derived from DL blank subframe definition. Scheduling can orthogonalize data transmissions. A femto cell temporarily reducing uplink bandwidth can mitigate uplink control channel residual interference from a non-allowed UE. A relay configures RACH occasion to coincide with non-blank UL subframes as much as possible. UE knowledge of RACH occasion is sufficient to start RACH and hand over procedure. RACH occasions with 10 ms periodicity are supported by assigning all odd/even uplink HARQ interlaces to relay. RACH occasions with 20 ms periodicity are supported by assigning any of the ¼ UL HARQ interlaces to relay.

22 Claims, 11 Drawing Sheets

(51) Int. Cl.
*H04W 74/08* (2009.01)
*H04B 7/26* (2006.01)
*H04W 84/04* (2009.01)

(56) References Cited

U.S. PATENT DOCUMENTS

| | | | |
|---|---|---|---|
| 6,633,559 B1 | 10/2003 | Asokan et al. | |
| 6,731,705 B2 * | 5/2004 | Kasapi et al. | 375/346 |
| 6,836,673 B1 * | 12/2004 | Trott | 455/562.1 |
| 7,151,795 B1 * | 12/2006 | Goldburg | 375/227 |
| 7,181,184 B1 | 2/2007 | Dimeo et al. | |
| 7,688,797 B2 * | 3/2010 | Bolinth et al. | 370/344 |
| 7,756,096 B2 | 7/2010 | Kneckt et al. | |
| 8,203,979 B2 | 6/2012 | Zhang et al. | |
| 8,275,322 B2 | 9/2012 | Khojastepour et al. | |
| 8,787,241 B2 | 7/2014 | Pinheiro et al. | |
| 2002/0126777 A1 * | 9/2002 | Kasapi et al. | 375/346 |
| 2002/0176364 A1 | 11/2002 | Nakamura et al. | |
| 2004/0252631 A1 * | 12/2004 | Park | 370/210 |
| 2005/0239399 A1 | 10/2005 | Karabinis | |
| 2007/0150928 A1 | 6/2007 | Hottinen | |
| 2007/0200742 A1 * | 8/2007 | Putter | 341/144 |
| 2008/0008126 A1 | 1/2008 | Shirakabe et al. | |
| 2008/0026718 A1 | 1/2008 | Wangard et al. | |
| 2008/0068979 A1 | 3/2008 | Visotsky et al. | |
| 2008/0165719 A1 | 7/2008 | Visotsky | |
| 2008/0176523 A1 * | 7/2008 | Sutton et al. | 455/76 |
| 2008/0176575 A1 * | 7/2008 | Sutton | 455/450 |
| 2008/0285523 A1 | 11/2008 | Bjorken | |
| 2009/0061894 A1 | 3/2009 | Karabinis | |
| 2009/0147706 A1 | 6/2009 | Yu et al. | |
| 2009/0185632 A1 | 7/2009 | Cai et al. | |
| 2009/0197629 A1 | 8/2009 | Borran et al. | |
| 2009/0291667 A1 | 11/2009 | Vakil et al. | |
| 2009/0293477 A1 | 12/2009 | Shu et al. | |
| 2010/0002656 A1 | 1/2010 | Ji et al. | |
| 2010/0029278 A1 | 2/2010 | Fang et al. | |
| 2010/0029289 A1 | 2/2010 | Love et al. | |
| 2010/0067427 A1 | 3/2010 | Choudhury | |
| 2010/0074209 A1 * | 3/2010 | Montojo et al. | 370/329 |
| 2010/0080166 A1 | 4/2010 | Palanki et al. | |
| 2010/0135235 A1 | 6/2010 | Ji et al. | |
| 2010/0315889 A1 | 12/2010 | Thomas et al. | |
| 2010/0315989 A1 | 12/2010 | Reznik et al. | |

FOREIGN PATENT DOCUMENTS

| | | |
|---|---|---|
| JP | 2096439 A | 4/1990 |
| JP | 2000503831 A | 3/2000 |
| JP | 2002353878 A | 12/2002 |
| JP | 2003516652 A | 5/2003 |
| JP | 2006254155 A | 9/2006 |
| JP | 2007251935 A | 9/2007 |
| JP | 2008532454 A | 8/2008 |
| JP | 2008236370 A | 10/2008 |
| WO | WO-2007045504 A1 | 4/2007 |
| WO | WO-2008108223 A1 | 9/2008 |
| WO | WO-2009075631 A2 | 6/2009 |
| WO | WO-2010002306 A1 | 1/2010 |
| WO | WO-2010016693 A2 | 2/2010 |
| WO | WO-20100146693 | 11/2010 |

OTHER PUBLICATIONS

3GPP: 3GPP TS 36.331 V8.3.0 (Sep. 2008); 3rd Generation Partnership Project; Technical Specification Group Radio Access Network; Evolved Universal Terrestrial Radio Access (E-UTRA); Radio Resource Control (RRC); Protocol Specification (Release 8); pp. 1-9, 90, 91, 107, 110, 111; 3GPP Sep. 23, 2008.

Ericsson: "Spurious emission into adjacent bands" 3GPP Draft; R4-082459, SRD Generation Partnership Project (3GPP), Mobile Competence Centre ; 650, Route Des Lucioles ; F-06921 Sophia-Antipolis Cedex ; France, no. Scotland; Sep. 26, 2008, XP050325722 [retrieved on Sep. 26, 2008].

International Search Report and Written Opinion—PCT/US2009/066289, International Search Authority—European Patent Office—Jul. 27, 2010.

Motorola: "PUCCH Frequency Location" 3GPP Draft; R1-083886 PUCCH Frequency Location and CR, SRD Generation Partnership Project (3GPP), Mobile Competence Centre ; 650, Route Des Lucioles ; F-06921 Sophia-Antipolis Cedex ; France, no. Prague, Czech Republic; Sep. 25, 2008, XP050317372 [retrieved on Sep. 25, 2008].

Partial International Search Report-PCT/US2009/066289-Partial International Search Authority-European Patent Office, May 10, 2010.

QUALCOMM Europe, "Support of REL-8 Ues by LTE-A Relays", 3GPP RAN WG1 R1-084384, Meeting 55, 3GPP RAN WG1, Nov. 10-14, 2008.

RAN4: "LS on UE emission control" 3GPP Draft; R3-082951_R4-082585, SRD Generation Partnership Project (3GPP), Mobile Competence Centre ; 650, Route Des Lucioles ; F-06921 Sophia-Antipolis Cedex ; France, no. Prague, Czech Republic; Oct. 27, 2008, XP050324191 [retrieved on Oct. 27, 2008].

Taiwan Search Report—TW098141056—TIPO—May 15, 2013.

* cited by examiner

APPARATUS *1202*

MEANS FOR DETERMINING A HALF DUPLEX SCHEDULE OF PERFORMING NON-SIMULTANEOUS RECEIVING AND TRANSMITTING BY A RELAY WITH AN ACCESS NODE *1204*

MEANS FOR DETERMINING A PHYSICAL RANDOM ACCESS CHANNEL CONFIGURATION HAVING A RANDOM ACCESS CHANNEL OCCASION THAT COINCIDES WITH THE HALF DUPLEX SCHEDULE *1206*

MEANS FOR PERFORMING A RANDOM ACCESS CHANNEL PROCEDURE WITH THE ACCESS NODE VIA THE RELAY BY USING THE PHYSICAL RANDOM ACCESS CHANNEL CONFIGURATION *1208*

*FIG. 12*

APPARATUS *1302*

MEANS FOR SCHEDULING A USER EQUIPMENT TO USE AN UPLINK HAVING A FIRST BANDWIDTH *1304*

MEANS FOR DEFINING A BAND EDGE PORTION OF THE FIRST BANDWIDTH THAT INCLUDES AN INTERFERENCE SIGNAL *1306*

MEANS FOR SCHEDULING A REDUCED PORTION OF AN UPLINK BANDWIDTH TO THE USER EQUIPMENT THAT AVOIDS THE BAND EDGE PORTION *1308*

MEANS FOR RECEIVING THE REDUCED PORTION OF THE UPLINK BANDWIDTH BY FILTERING OUT THE BAND EDGE PORTION *1310*

*FIG. 13*

BLANK SUBFRAME UPLINK DESIGN

CLAIM OF PRIORITY UNDER 35 U.S.C. §119 AND §120

The present application is a Continuation application of U.S. Ser. No. 12/626,236, filed Nov. 25, 2009, entitled "Blank Subframe Uplink Design" which claims priority to Provisional Application No. 61/118,891 entitled "Blank Subframe Uplink Design" filed Dec. 1, 2008, and assigned to the assignee hereof and hereby expressly incorporated by reference herein.

BACKGROUND

1. Field

The present disclosure relates generally to communication, and more specifically for scheduling in a wireless communication network.

2. Background

Wireless communication systems are widely deployed to provide various types of communication content such as voice, data, and so on. These systems may be multiple access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, and orthogonal frequency division multiple access (OFDMA) systems.

Generally, a wireless multiple access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output (SISO), multiple-input-single-output (MISO), single-input-multiple-output (SIMO) or a multiple-input-multiple-output (MIMO) system.

Universal Mobile Telecommunications System (UMTS) is one of the third-generation (3G) cell phone technologies. UTRAN, short for UMTS Terrestrial Radio Access Network, is a collective term for the base nodes (Node B's) and Radio Network Controllers (RNC) which make up the UMTS core network. This communications network can carry many traffic types, from real-time Circuit Switched to IP based Packet Switched. The UTRAN allows connectivity between the UE (user equipment) and the core network. The UTRAN contains the base stations, which are called Node Bs, and RNCs. The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

Third Generation Partnership Project (3GPP) LTE (Long Term Evolution) is the name given to a project within the 3GPP to improve the UMTS mobile phone standard to cope with future requirements. Goals include improving efficiency, lowering costs, improving services, making use of a new spectrum of opportunities, and better integration with other open standards. The LTE system is described in the Evolved UTRA (EUTRA) and Evolved UTRAN (EUTRAN) series of specifications. In order to provide improved communication services and increased efficiency, cellular communication systems are continuously developed and enhanced. Currently, the 3rd Generation Partnership Project (3GPP) standards body is in the process of standardizing improvements to the Universal Mobile Telecommunication System (UMTS) known as LTE.

Similarly, to advanced communication services, such as High Speed Downlink Packet Access (HSDPA) and High Speed Uplink Packet Access (HSUPA), LTE uses a very fast scheduling of communication resources allocated to user traffic and control data over the air interface. Specifically, scheduling for user traffic may be performed in the individual serving base station (eNodeB) thereby allowing scheduling to be so fast that it can follow changes in the characteristics of the propagation channels to the individual User Equipments (UEs). This is used to schedule data for UEs such that data is predominantly scheduled for UEs which currently experience advantageous propagation conditions. The fast scheduling may be performed both for uplink user data traffic transmitted on a physical channel known as the Physical Uplink Shared CHannel (PUSCH) and for downlink user data traffic transmitted on a physical channel known as the Physical Downlink Shared CHannel (PDSCH).

In LTE, the resource allocation can be changed in sub-frames having a duration of only 1 ms with a typical scheduling interval (i.e., how often the scheduling algorithm runs) of between 1 and 10 sub-frames. One frame consists of 10 such consecutive sub-frames. The PUSCH and PDSCH are shared channels wherein the scheduling is not only dependent on the current propagation conditions but also on the resource requirement of the UEs. In order to simplify the scheduling and to reduce the signaling overhead, LTE allows for persistent scheduling wherein a resource allocation for the PUSCH or PDSCH may be made for a plurality of subframes.

In order to provide efficient fast scheduling in the base station, the UE must transmit uplink control information to the scheduling base station. Specifically, the UE transmits Channel Quality Indicator (CQI) data which is indicative of the current propagation conditions for the UE. Based on the measurements of the received signal, the UE generates a CQI which may indicate a modulation scheme and data rate that is considered to be supportable by the air interface communication channel from the base station to the UE, or which may be a measure of the Signal to Noise plus Interference Ratio. As another example, LTE uses a retransmission scheme (referred to as Automatic Repeat reQuest (ARQ) or Hybrid ARQ (HARQ)) and the UE transmits ARQ data in the form of uplink acknowledge (ACK) or non-acknowledge (NACK) messages which are used to determine whether individual data packets need to be retransmitted. As yet another example, LTE allows the base station to utilize adaptive antenna technology and the UE may report a Precoding Matrix Index (PMI) which is used to signal the antenna weights recommended by the UE for the individual antenna elements.

The uplink control information is transmitted using physical uplink channels. Specifically, in sub-frames wherein the UE transmits uplink user data traffic on the PUSCH, the control data is embedded within the transmission such that the control information is transmitted to the base station using the PUSCH. However, for sub-frames wherein no uplink user data traffic is transmitted on the PUSCH, the UE uses a physical uplink channel known as the Physical Uplink Control CHannel (PUCCH) to transmit the control information. Thus, the physical air interface channel used for the transmission of the control information may change for different sub-frames.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for interference mitigation in a wireless communication system by employing a processor executing computer executable instructions stored on a computer readable storage medium to implement the following acts: A half duplex schedule of performing non-simultaneous receiving and transmitting by a relay with an access node is determined. A physical random access channel configuration is determined having a random access channel occasion that coincides with the half duplex schedule. A random access channel procedure is performed with the access node via the relay by using the physical random access channel configuration.

In another aspect, a computer program product is provided for interference mitigation in a wireless communication system. At least one computer readable storage medium stores computer executable instructions that, when executed by at least one processor, implement components: A first set of codes determines a half duplex schedule of performing non-simultaneous receiving and transmitting by a relay with an access node. A second set of codes determines a physical random access channel configuration having a random access channel occasion that coincides with the half duplex schedule. A third set of codes performs a random access channel procedure with the access node via the relay by using the physical random access channel configuration.

In an additional aspect, an apparatus is provided for interference mitigation in a wireless communication system. At least one computer readable storage medium stores computer executable instructions that, when executed by the at least one processor, implement components: Means are provided for determining a half duplex schedule of performing non-simultaneous receiving and transmitting by a relay with an access node. Means are provided for determining a physical random access channel configuration having a random access channel occasion that coincides with the half duplex schedule. Means are provided for performing a random access channel procedure with the access node via the relay by using the physical random access channel configuration.

In a further aspect, an apparatus is provided for interference mitigation in a wireless communication system. A computing platform determines a half duplex schedule of performing non-simultaneous receiving and transmitting by a relay with an access node and determines a physical random access channel configuration having a random access channel occasion that coincides with the half duplex schedule. A transmitter and a receiver perform a random access channel procedure with the access node via the relay by using the physical random access channel configuration.

In yet one aspect, a method is provided for interference mitigation in a wireless communication system by employing a processor executing computer executable instructions stored on a computer readable storage medium to implement the following acts: A user equipment is scheduled to use an uplink having a first bandwidth. A band edge portion of the first bandwidth is defined that includes an interference signal. A reduced portion of an uplink bandwidth is scheduled to the user equipment that avoids the band edge portion. The reduced portion of the uplink bandwidth is received by filtering out the band edge portion.

In yet another aspect, a computer program product is provided for interference mitigation in a wireless communication system. At least one computer readable storage medium stores computer executable instructions that, when executed by at least one processor, implement components: A first set of codes schedules a user equipment to use an uplink having a first bandwidth. A second set of codes defines a band edge portion of the first bandwidth that includes an interference signal. A third set of codes schedules a reduced portion of an uplink bandwidth to the user equipment that avoids the band edge portion. A fourth set of codes receives the reduced portion of the uplink bandwidth by filtering out the band edge portion.

In yet an additional aspect, an apparatus is provided for interference mitigation in a wireless communication system. At least one computer readable storage medium stores computer executable instructions that, when executed by the at least one processor, implement components: Means are provided for scheduling a user equipment to use an uplink having a first bandwidth. Means are provided for defining a band edge portion of the first bandwidth that includes an interference signal. Means are provided for scheduling a reduced portion of an uplink bandwidth to the user equipment that avoids the band edge portion. Means are provided for receiving the reduced portion of the uplink bandwidth by filtering out the band edge portion.

In yet a further aspect, an apparatus is provided for interference mitigation in a wireless communication system. A scheduler schedules a user equipment via a transmitter to use an uplink having a first bandwidth. A computing platform defines a band edge portion of the first bandwidth that includes an interference signal. The scheduler further schedules a reduced portion of an uplink bandwidth via the transmitter to the user equipment that avoids the band edge portion. A receiver receives the reduced portion of the uplink bandwidth by filtering out the band edge portion.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 12 illustrates a block diagram of an apparatus having means for interference mitigation in a wireless communication system.

FIG. 13 illustrates a block diagram of an apparatus having means for interference mitigation in a heterogeneous wireless communication system.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1A:
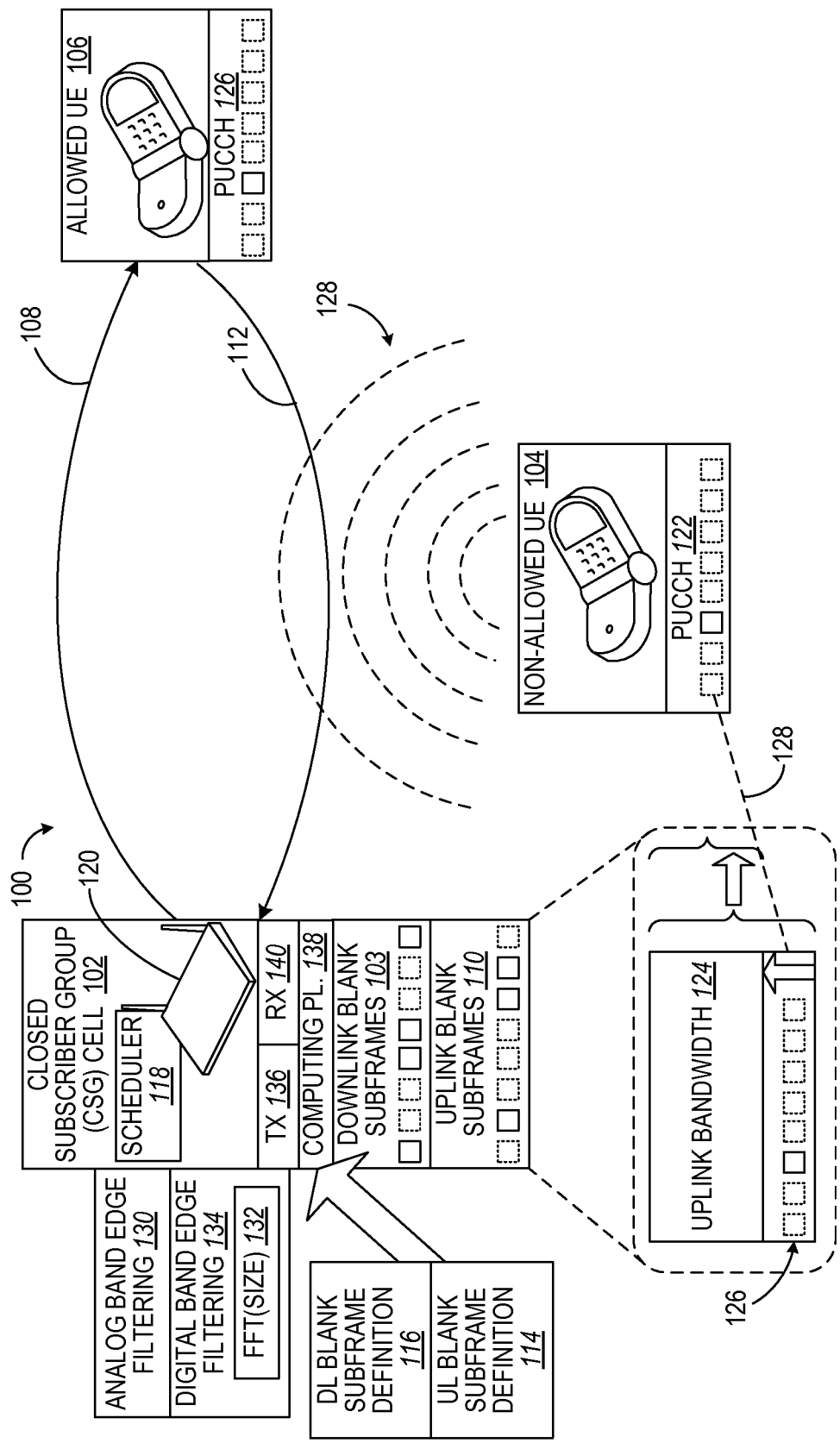
FIG. 1A illustrates a node that performs interference mitigation in a heterogeneous wireless network by reducing uplink bandwidth.

In FIG. 1, in a communication system 100, a Closed Subscription Group (CSG) cell 102 provides interference mitigation by reduced uplink bandwidth. In particular, in such CSG deployments, Downlink (DL) blank subframes 103 enable a non-allowed User Equipment (UE) 104 to co-exist with an allowed UE 106 to CSG cells 102 on a same downlink carrier 108.

Uplink (UL) blank subframes 110 are specified to orthogonalize transmissions on an UL 112 by the non-allowed UE 104 and allowed UE 106. In an exemplary aspect, this could be done either via explicit UL blank subframe definition 114 or, in the alternative, derived from DL blank subframe definition 116.

In the case where no clean UL blank subframes are defined, a scheduler 118 of a node 120 (e.g., femto cell, Home evolved Base Node (HeNB), etc.) of the CSG cell 102 schedules the allowed UE 106 in order to orthogonalize data transmissions. However, the Physical Uplink Control Channel (PUCCH) residual interference 122 from a non-allowed UE 104 could be very high and desense a close by HeNB 120.

The CSG cell 102 can avoid this situation by temporarily reducing the UL Bandwidth (BW), as depicted at 124. The advertised system BW could stay the same, but a PUCCH 126 by the allowed UE 106 could be moved further inside once high interference 128 is detected. With a few connected UEs 106 in the case of a femto cell 120, this would work.

One implementation to reduce UL bandwidth is to change an analog filter 130, size 132 of a Fast Fourier Transform (FFT) 134, etc to exclude the band edge interference. There could be different alternate implementations. The FFT size can stay the same but there needs to be some filtering, either analog or digital (i.e., A/D quantization permitting). In an illustrative prototype, this may be done with simply reloading the filter coefficients without any real Hardware (HW) change.

Thus, in an exemplary aspect, an apparatus such as the CSG cell 102 is provided for interference mitigation in a wireless communication system. The scheduler 118 schedules the UE 106 via a transmitter (TX) 136 to use the uplink 112 having a first bandwidth. A computing platform 138 defines a band edge portion of the first bandwidth that includes an interference signal. The scheduler 118 further schedules a reduced portion of an uplink bandwidth via the transmitter 136 to the UE 106 that avoids the band edge portion. A receiver (RX) 140 receives the reduced portion of the uplink bandwidth by filtering out the band edge portion.

Figure 1B:
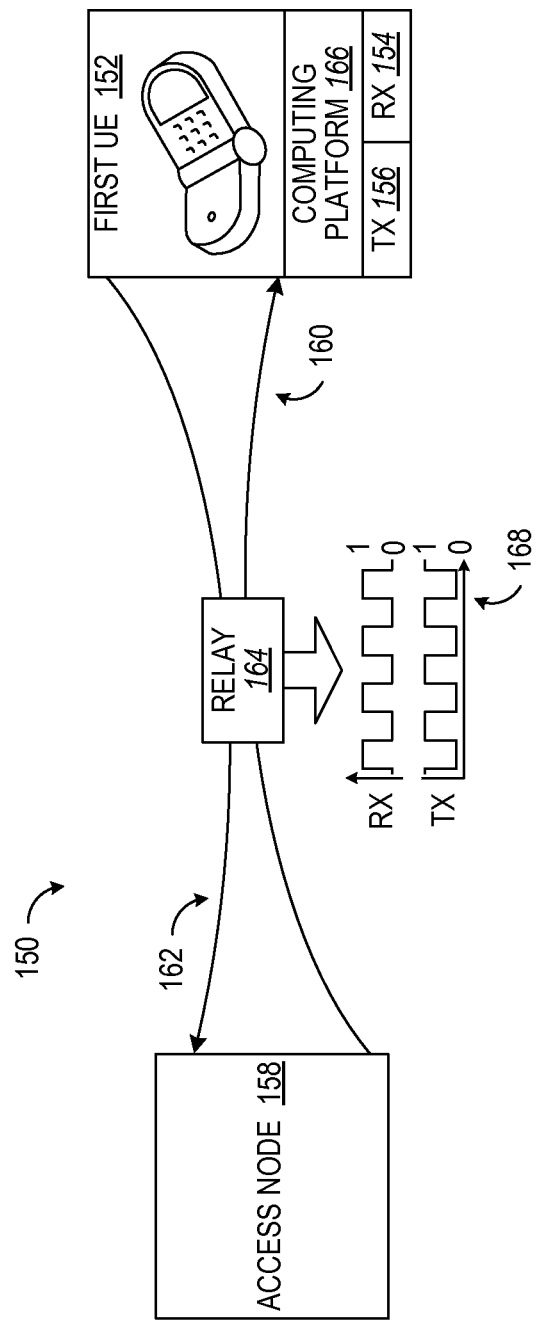
FIG. 1B illustrates a block diagram of a user equipment performing a handover with a node via a relay that uses half-duplex transmission and reception.

In FIG. 1B, a network 150 is depicted for UL Hybrid Automatic Repeat Request (HARQ) process allocation for Random Access Channel (RACH) support. An apparatus, depicted as UE 152, has a receiver (RX) 154 and a transmitter (TX) 156 for interacting with an access node 158 via a downlink 160 and uplink 162 respectively. At least one of the downlink 160 and uplink 162 rely upon a relay 164. The UE 152 has a computing platform 166 that determines a half duplex schedule 168 of performing non-simultaneous receiving and transmitting by the relay 164 with the access node 158. The computing platform 166 further determines a Physical Random Access Channel (PRACH) configuration having a random access channel occasion that coincides with the half duplex schedule 168. Thereby, the UE 152 can utilize the transmitter 156 and the receiver 154 for performing a random access channel procedure with the access node 158 via the relay 164 by using the physical random access channel configuration.

In an exemplary aspect, without knowledge of UL blank subframe configuration, a relay could configure RACH occasion to coincide with the non-blank UL subframes as much as possible. With this design, the knowledge of RACH occasion is sufficient for an UE to start RACH and hand over procedure. Note that RACH occasion has 10 and 20 ms periodicity as shown in TABLE 1 below.

The 10 ms periodicity could be supported by assigning all odd/even UL HARQ interlaces to relay. Not all RACH configurations could be supported (such as, for example, 6, 7, 9), because the RACH opportunity spans all UL interlaces. In these cases, there will be some puncturing on RACH occasions. Note that the annotated entries correspond to the UL subframes (4, 8, 9, 3) that map to the DL (0, 4, 5, 9) subframes, which is always available on the access link. The annotated entries are for Physical Research Access Channel (PRACH) Configuration Index 1, 4, 8 (subframe numbers 3, 8); Index 10 (subframe 8), Index 11 (subframe 3, 9), Index 12 (subframe 4), Index 14 (subframe 4), and Indices 15, 17 and 20. As one example, Configuration ("Config") 12 could be supported by assigning 4 HARQ processes that map to even subframes to the access link.

The 20 ms periodicity could be supported by assigning any of the ¼ UL HARQ interlaces to relay. For example Config 0 could be supported by assigning two UL HARQ processes that include subframes {1, 9, 17, 25, 33} and {5, 13, 21, 29, 37} to the access link. In this case, all RACH occasions occur on the access link UL subframes.

In TABLE 1, an exemplary frame structure type 1 random access configuration is depicted for preamble format 0-3.

TABLE 1

| PRACH Configuration Index | Preamble Format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |

TABLE 1-continued

| PRACH Configuration Index | Preamble Format | System frame number | Subframe number |
| --- | --- | --- | --- |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

In some aspects the teachings herein may be employed in a network that includes macro scale coverage (e.g., a large area cellular network such as a 3G or 4G network, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 2:
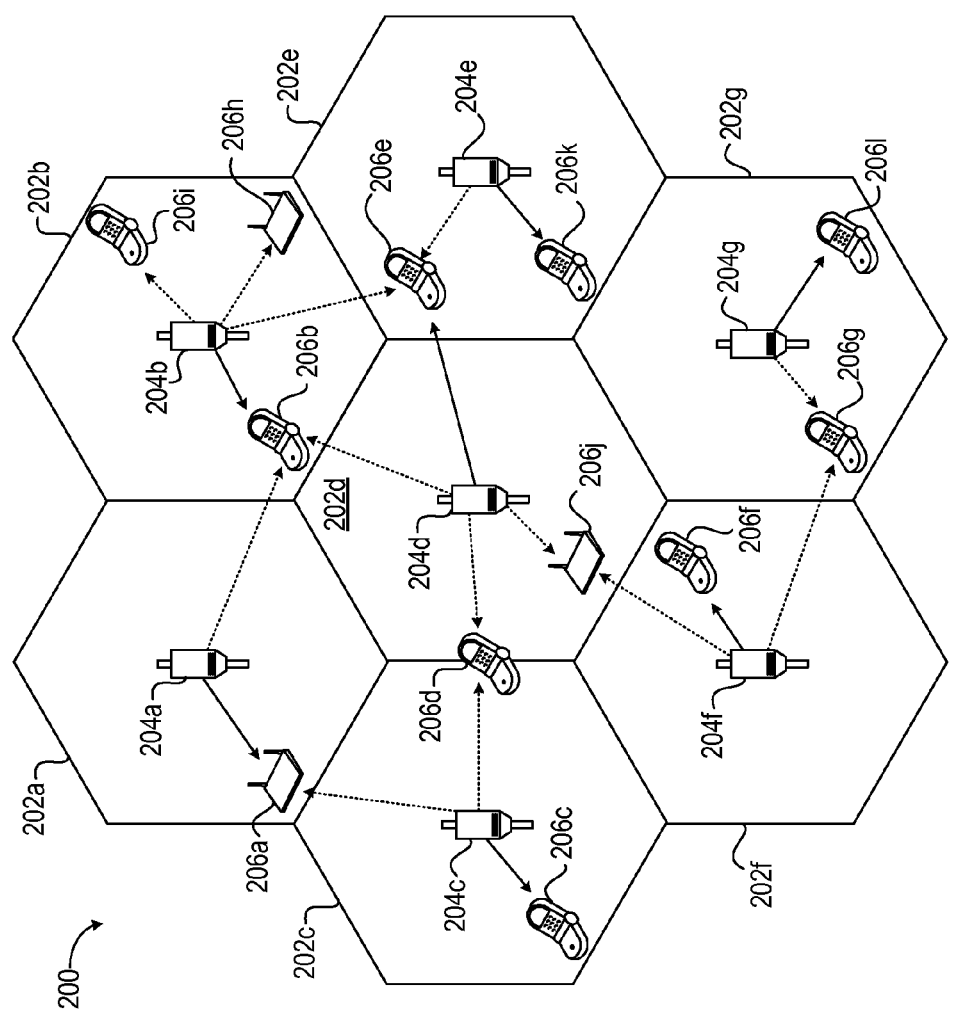
FIG. 2 illustrates a diagram of a wireless communication system configured to support a number of users.

FIG. 2 illustrates a wireless communication system 200, configured to support a number of users, in which the teachings herein may be implemented. The system 200 provides communication for multiple cells 202, such as, for example, macro cells 202a-202g, with each cell being serviced by a corresponding access node 204 (e.g., access nodes 204a-204g). As shown in FIG. 2, access terminals 206 (e.g., access terminals 206a-206l) may be dispersed at various locations throughout the system over time. Each access terminal 206 may communicate with one or more access nodes 204 on a forward link ("FL") and/or a reverse link ("RL") at a given moment, depending upon whether the access terminal 206 is active and whether it is in soft handoff, for example. The wireless communication system 200 may provide service over a large geographic region. For example, macro cells 202a-202g may cover a few blocks in a neighborhood.

Figure 3:
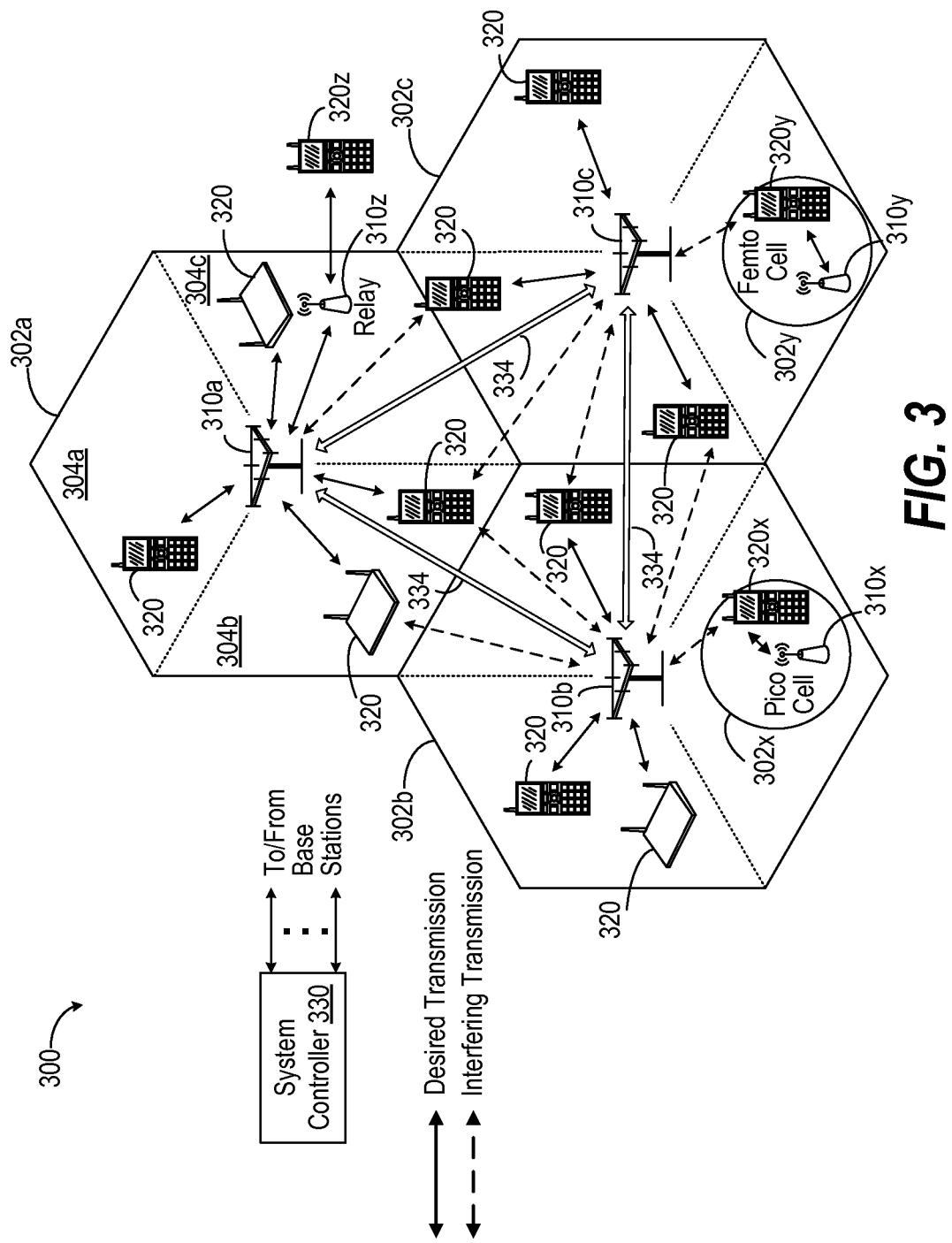
FIG. 3 illustrates a diagram of a wireless communication system comprising macro cells, femto cells and pico cells.

In the example shown in FIG. 3, base stations 310a, 310b and 310c may be macro base stations for macro cells 302a, 302b and 302c, respectively. Base station 310x may be a pico base station for a pico cell 302x communicating with terminal 320x. Base station 310y may be a femto base station for a femto cell 302y communicating with terminal 320y. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310z that communicates with terminal 320z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310a-310c employing such a distributed architecture. Base stations 310a-310c may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and different impact on interference in wireless network 300. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at base station 310, where each group of antennas is responsible for communication with terminals 320 in a portion of the cell 302a, 302b, or 302c. For example, a base station 310 serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
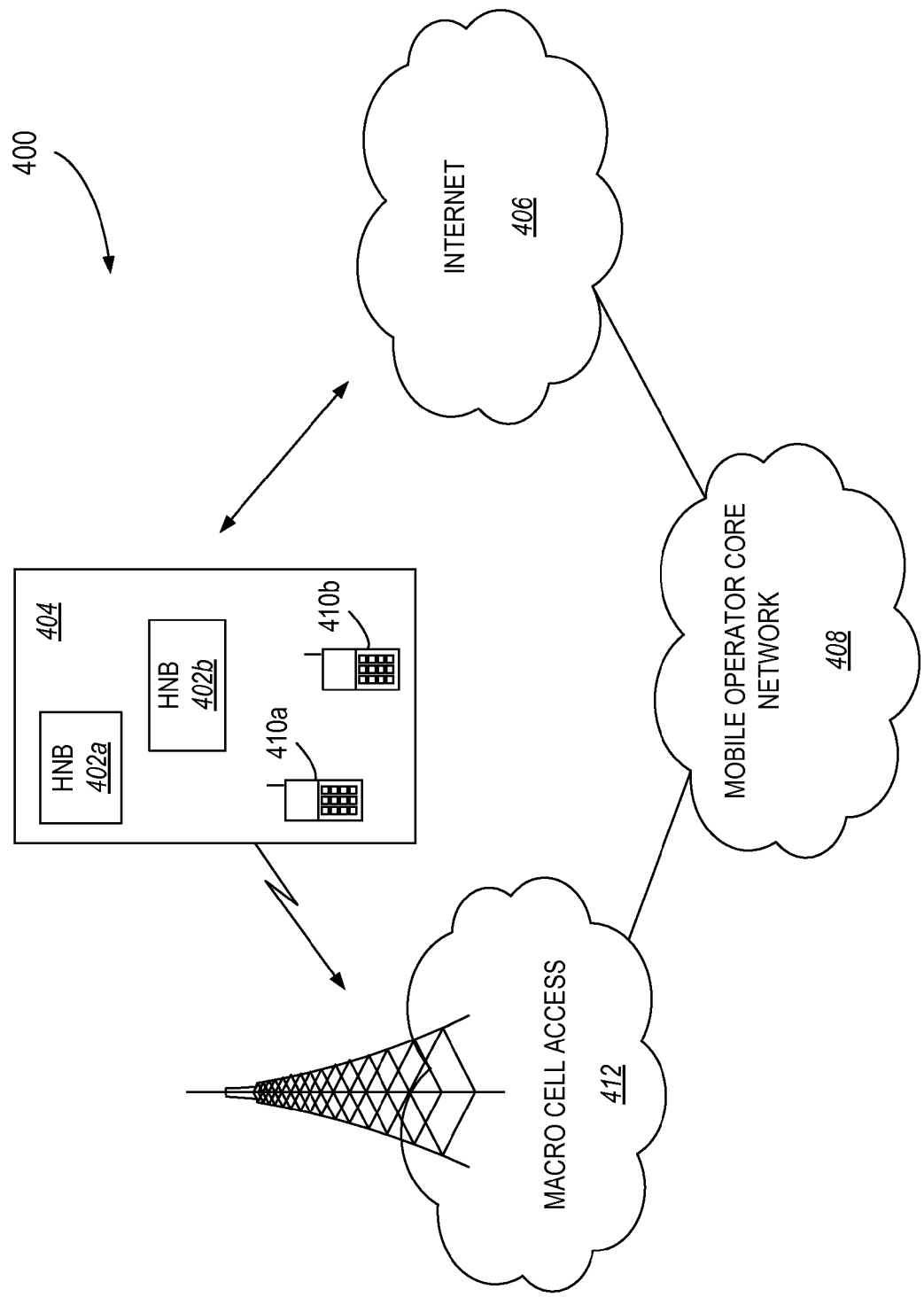
FIG. 4 illustrates a diagram of a communication system where one or more femto nodes are deployed within a network environment.

FIG. 4 illustrates an exemplary communication system 400 where one or more femto nodes are deployed within a network environment. Specifically, the system 400 includes multiple femto nodes, depicted as Home Base Nodes (HNBs) 402a and 402b, installed in a relatively small scale network environment (e.g., in one or more user residences 404). Each femto node 402a-402b may be coupled to a wide area network 406 (e.g., the Internet) and a mobile operator core network 408 via a DSL router, a cable modem, a wireless link, or other connectivity means (not shown). As will be discussed below, each femto node 402a-402b may be configured to serve associated access terminals or user equipment (UE) 410a and, optionally, alien access UEs 410b (e.g., not a subscriber to a closed subscriber group). In other words, access to femto nodes 402a-402b may be restricted whereby a given UE 410a-410b may be served by a set of designated (e.g., home) femto node(s) 402a-402b but may not be served by any non-designated femto nodes 402a-402b (e.g., a neighbor's femto node 402a-402b).

The owner of a femto node 410 may subscribe to mobile service, such as, for example, 3G mobile service, offered through the mobile operator core network 408. In addition, an access terminal or UE 410a-410b may be capable of operating both in macro environments and in smaller scale (e.g., residential) network environments. In other words, depending on the current location of the UE 410a-410b, the access terminal 410a-410b may be served by an access node or macro base node 412 of the macro cell mobile network 408 or by any one of a set of femto nodes 410 (e.g., the femto nodes 402a-402b that reside within a corresponding user residence 404). For example, when a subscriber is outside his home, he is served by a standard macro access node (e.g., node 412) and when the subscriber is at home, he is served by a femto node (e.g., node 402a-402b). Here, it should be appreciated that a femto node 402a-402b may be backward compatible with existing access terminals or UEs 410a-410b.

A femto node 402a-402b may be deployed on a single frequency or, in the alternative, on multiple frequencies. Depending on the particular configuration, the single frequency or one or more of the multiple frequencies may overlap with one or more frequencies used by a macro node (e.g., node 412).

In some aspects, an access terminal or UE 410a-410b may be configured to connect to a preferred femto node (e.g., the home femto node of the access terminal or UE 410a-410b) whenever such connectivity is possible. For example, whenever the access terminal or UE 410a-410b is within the user's residence 404, it may be desired that the access terminal or UE 410a-410b communicate only with the home femto node 402a-402b.

In some aspects, if the access terminal or UE 410a-410b operates within the macro cellular network 408 but is not residing on its most preferred network (e.g., as defined in a preferred roaming list), the access terminal or UE 410a-410b may continue to search for the most preferred network (e.g., the preferred femto node 402a-402b) using a Better System Reselection ("BSR"), which may involve a periodic scanning of available systems to determine whether better systems are currently available, and subsequent efforts to associate with such preferred systems. With the acquisition entry, the access terminal or UE 410a-410b may limit the search for specific band and channel. For example, the search for the most preferred system may be repeated periodically. Upon discovery of a preferred femto node 402a-402b, the access terminal 410a-410b selects the femto node 402a-402b for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 402a-402b that reside within the corresponding user residence 404). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal or user equipment. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted; a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 5:
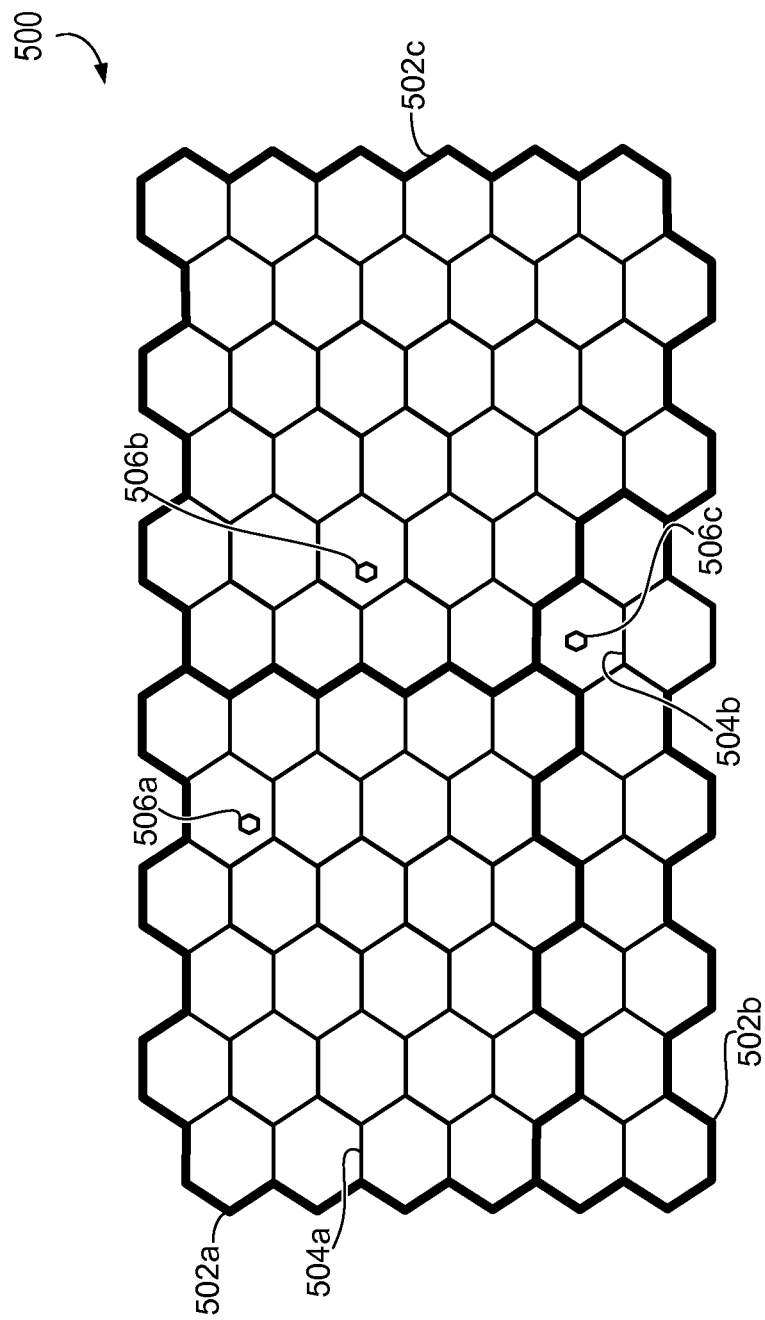
FIG. 5 illustrates a diagram of a coverage map where several tracking areas, routing areas or location areas are defined.

FIG. 5 illustrates an example of a coverage map 500 where several tracking areas 502 (or routing areas or location areas) are defined, each of which includes several macro coverage areas 504. Here, areas of coverage associated with tracking areas 502a, 502b, and 502c are delineated by the wide lines and the macro coverage areas 504 are represented by the hexagons. The tracking areas 502 also include femto coverage areas 506. In this example, each of the femto coverage areas 506 (e.g., femto coverage area 506c) is depicted within a macro coverage area 504 (e.g., macro coverage area 504b). It should be appreciated, however, that a femto coverage area 506 may not lie entirely within a macro coverage area 504. In practice, a large number of femto coverage areas 506 may be defined with a given tracking area 502 or macro coverage area 504. Also, one or more pico coverage areas (not shown) may be defined within a given tracking area 502 or macro coverage area 504.

Figure 6:
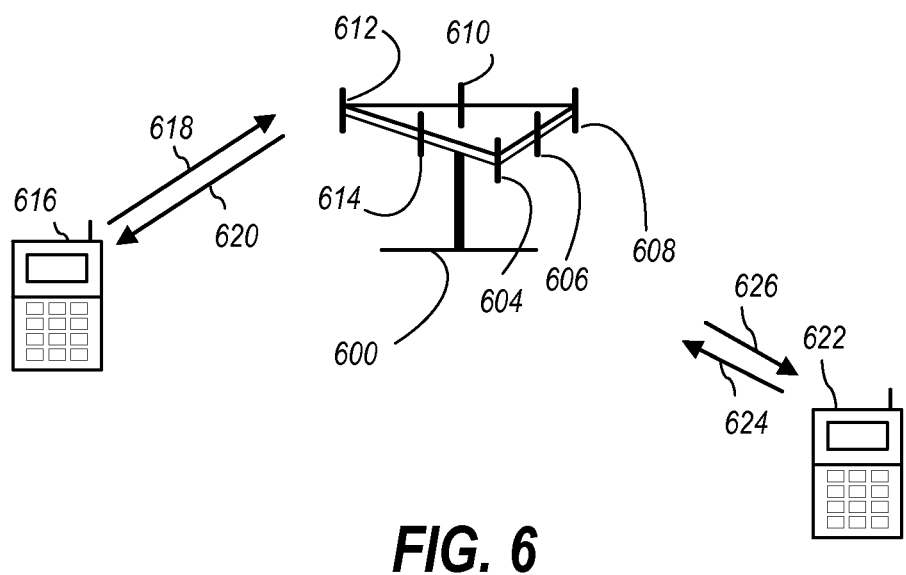
FIG. 6 illustrates a diagram of a multiple access wireless communication system.

Referring to FIG. 6, a multiple access wireless communication system according to one aspect is illustrated. An access point (AP) 600 includes multiple antenna groups, one including 606 and 606, another including 608 and 610, and an additional including 612 and 614. In FIG. 6, only two antennas are shown for each antenna group, however, more or fewer antennas may be utilized for each antenna group. Access terminal (AT) 616 is in communication with antennas 612 and 614, where antennas 612 and 614 transmit information to access terminal 616 over forward link 620 and receive information from access terminal 616 over reverse link 618. Access terminal 622 is in communication with antennas 606 and 608, where antennas 606 and 608 transmit information to access terminal 622 over forward link 626 and receive information from access terminal 622 over reverse link 624. In a FDD system, communication links 618, 620, 624 and 626 may use different frequencies for communication. For example, forward link 620 may use a different frequency then that used by reverse link 618.

Each group of antennas and/or the area in which they are designed to communicate is often referred to as a sector of the access point. In the aspect, antenna groups each are designed to communicate to access terminals in a sector, of the areas covered by access point 600.

In communication over forward links 620 and 626, the transmitting antennas of access point 600 utilize beamforming in order to improve the signal-to-noise ratio of forward links for the different access terminals 616 and 622. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 7:
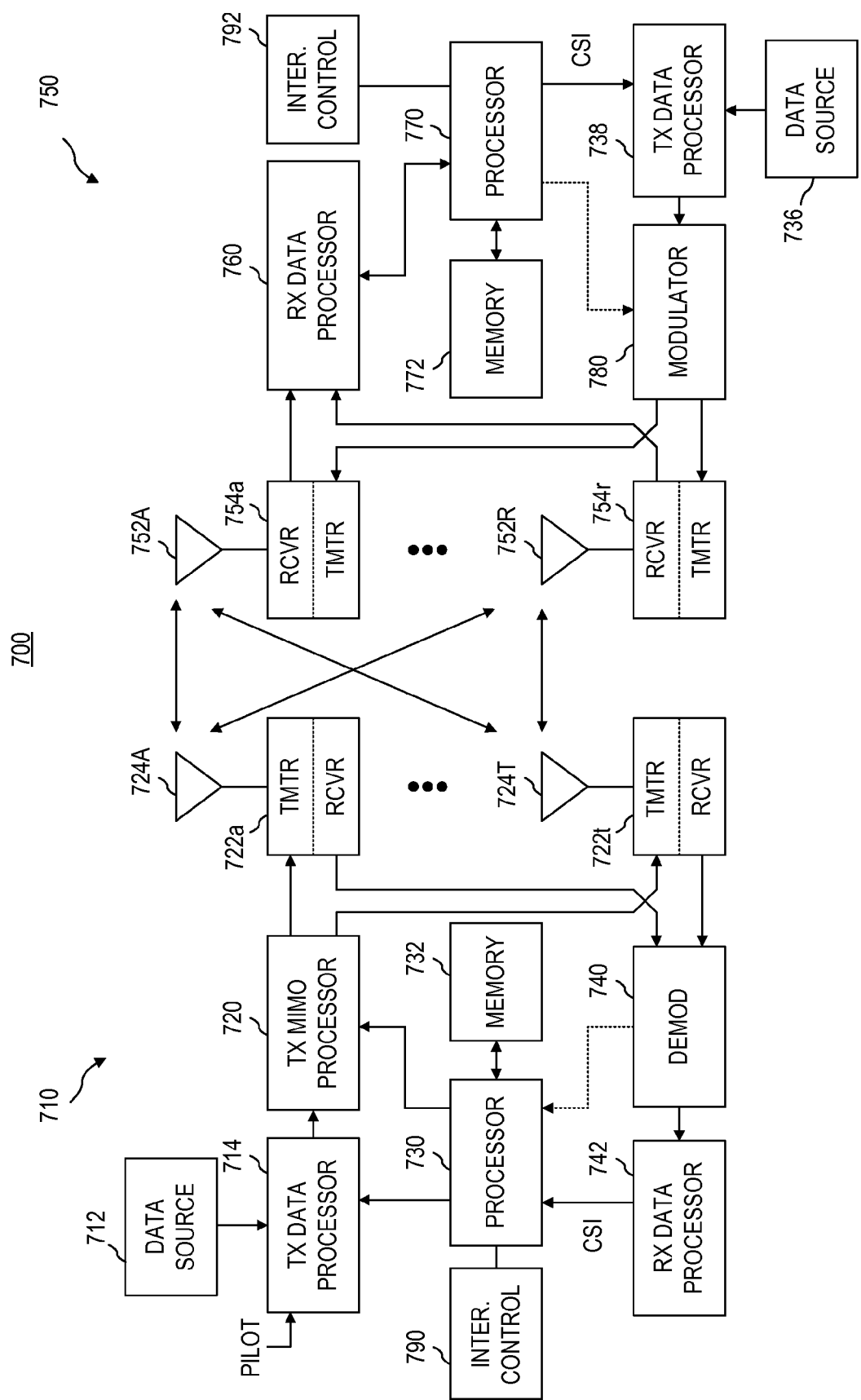
FIG. 7 illustrates a schematic of a multiple input multiple output (MIMO) communication system.

The teachings herein may be incorporated into a node (e.g., a device) employing various components for communicating with at least one other node. FIG. 7 depicts several sample components that may be employed to facilitate communication between nodes. Specifically, FIG. 7 illustrates a wireless device 710 (e.g., an access point) and a wireless device 750 (e.g., an access terminal) of a MIMO system 700. At the device 710, traffic data for a number of data streams is provided from a data source 712 to a transmit ("TX") data processor 714.

In some aspects, each data stream is transmitted over a respective transmit antenna. The TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 730. A data memory 732 may store program code, data, and other information used by the processor 730 or other components of the device 710.

The modulation symbols for all data streams are then provided to a TX MIMO processor 720, which may further process the modulation symbols (e.g., for OFDM). The TX MIMO processor 720 then provides $N_T$ modulation symbol streams to $N_T$ transceivers ("XCVR") 722a through 722t that each has a transmitter (TMTR) and receiver (RCVR). In some aspects, the TX MIMO processor 720 applies beam-forming weights to the symbols of the data streams and to the antenna from which the symbol is being transmitted.

Each transceiver 722a-722t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 722a through 722t are then transmitted from $N_T$ antennas 724a through 724t, respectively.

At the device 750, the transmitted modulated signals are received by $N_R$ antennas 752a through 752r and the received signal from each antenna 752a-752r is provided to a respective transceiver ("XCVR") 754a through 754r. Each transceiver 754a-754r conditions (e.g., filters, amplifies, and downconverts) a respective received signal, digitizes the conditioned signal to provide samples, and further processes the samples to provide a corresponding "received" symbol stream.

A receive ("RX") data processor 760 then receives and processes the $N_R$ received symbol streams from $N_R$ transceivers 754a-754r based on a particular receiver processing technique to provide $N_T$ "detected" symbol streams. The RX data processor 760 then demodulates, deinterleaves, and decodes each detected symbol stream to recover the traffic data for the data stream. The processing by the RX data processor 760 is complementary to that performed by the TX MIMO processor 720 and the TX data processor 714 at the device 710.

A processor 770 periodically determines which pre-coding matrix to use. The processor 770 formulates a reverse link message comprising a matrix index portion and a rank value portion. A data memory 772 may store program code, data, and other information used by the processor 770 or other components of the device 750.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by the transceivers 754a through 754r, and transmitted back to the device 710.

At the device 710, the modulated signals from the device 750 are received by the antennas 724a-724t, conditioned by the transceivers 722a-722t, demodulated by a demodulator ("DEMOD") 740, and processed by a RX data processor 742 to extract the reverse link message transmitted by the device 750. The processor 730 then determines which pre-coding matrix to use for determining the beam-forming weights then processes the extracted message.

FIG. 7 also illustrates that the communication components may include one or more components that perform interference control operations. For example, an interference ("INTER.") control component 790 may cooperate with the processor 730 and/or other components of the device 710 to send/receive signals to/from another device (e.g., device 750). Similarly, an interference control component 792 may cooperate with the processor 770 and/or other components of the device 750 to send/receive signals to/from another device (e.g., device 710). It should be appreciated that for each device 710 and 750 the functionality of two or more of the described components may be provided by a single component. For example, a single processing component may provide the functionality of the interference control component 790 and the processor 730 and a single processing component may provide the functionality of the interference control component 792 and the processor 770.

Figure 8:
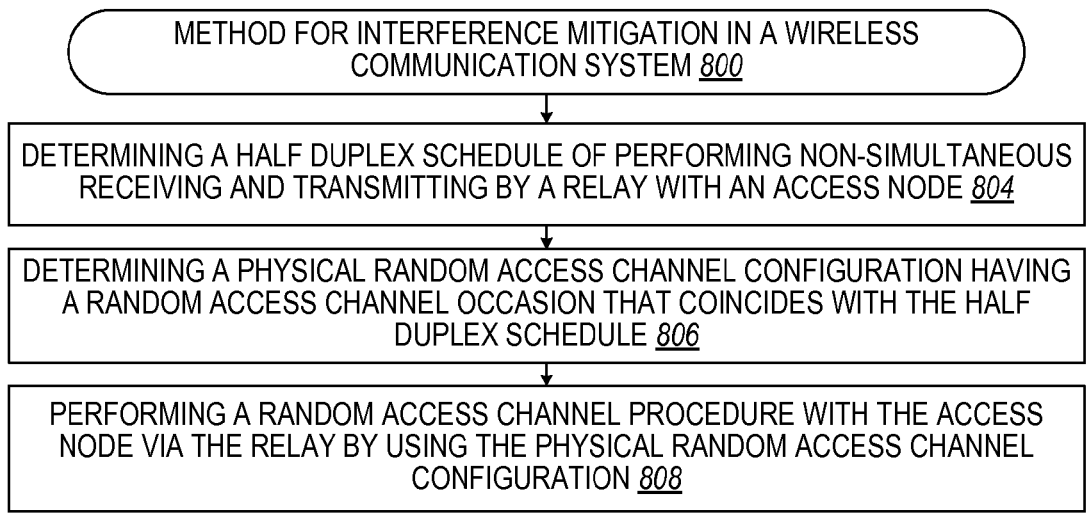
FIG. 8 illustrates a flow diagram of a methodology or sequence of operations for interference mitigation in a wireless communication system.

In FIG. 8, a methodology or sequence of operations 800 is depicted for interference mitigation in a wireless communication system by determining a half duplex schedule of performing non-simultaneous receiving and transmitting by a relay with an access node (block 804), determining a physical random access channel configuration having a random access channel occasion that coincides with the half duplex schedule (block 806), and performing a random access channel procedure with the access node via the relay by using the physical random access channel configuration (block 808).

Figure 9:
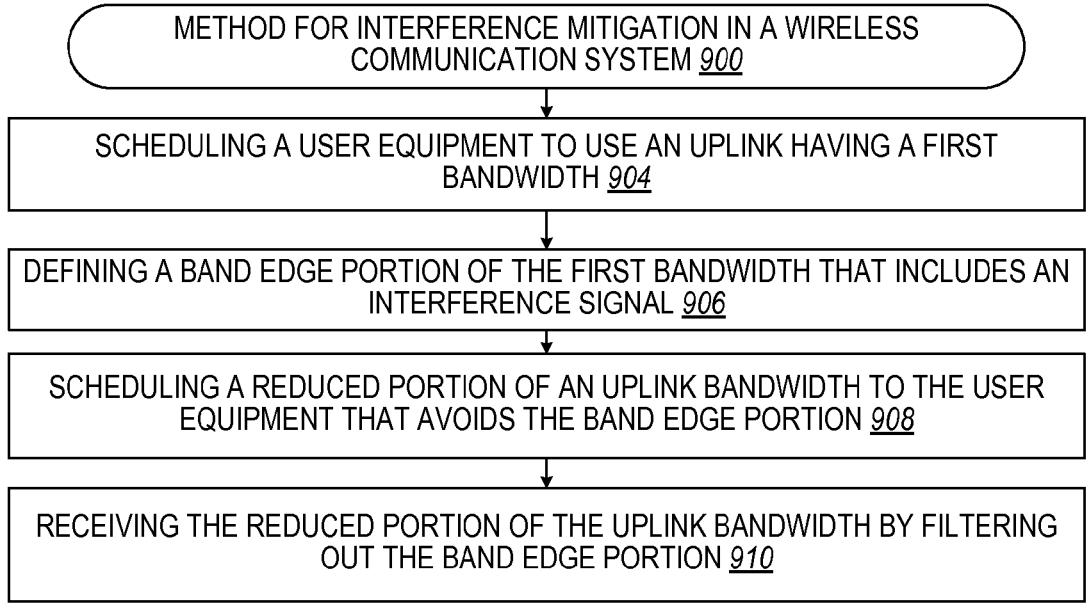
FIG. 9 illustrates a flow diagram of a methodology or sequence of operations for interference mitigation in a heterogeneous wireless communication system.

In FIG. 9, a methodology or sequence of operations 900 is depicted for interference mitigation in a heterogeneous wireless communication system by scheduling a user equipment to use an uplink having a first bandwidth (block 904), defining a band edge portion of the first bandwidth that includes an interference signal (block 906), scheduling a reduced portion of an uplink bandwidth to the user equipment that avoids the band edge portion (block 908), and receiving the reduced portion of the uplink bandwidth by filtering out the band edge portion (block 910).

Figure 10:
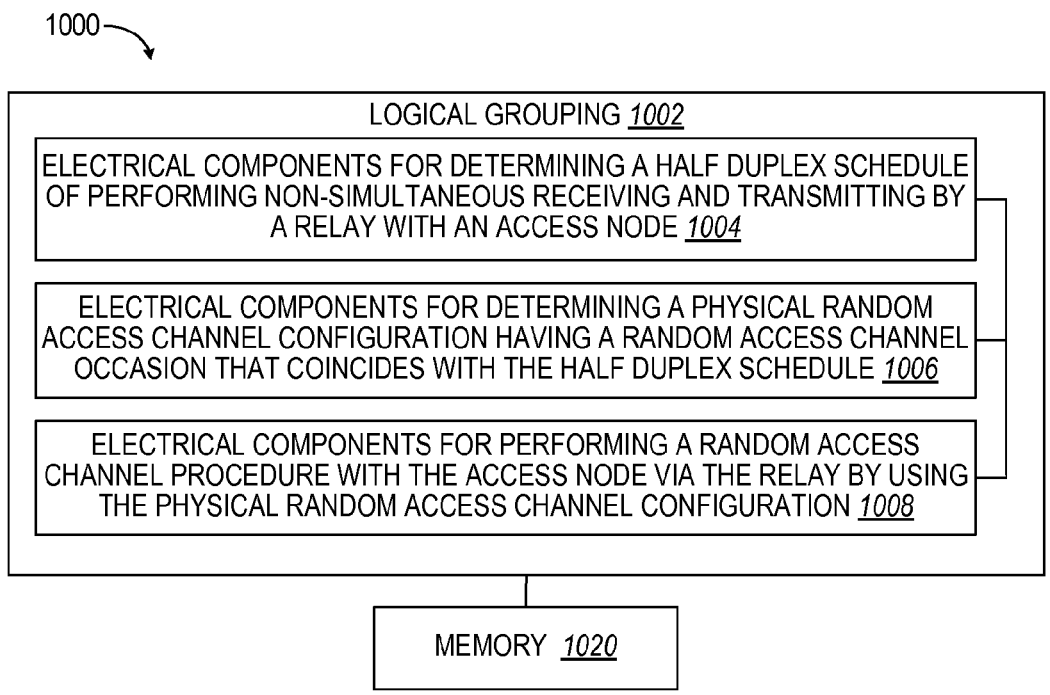
FIG. 10 illustrates a block diagram of a logical grouping of electrical components for interference mitigation in a wireless communication system that is incorporated at least in part in a user equipment.

With reference to FIG. 10, illustrated is a system 1000 for interference mitigation in a wireless communication system. For example, system 1000 can reside at least partially within user equipment (UE). It is to be appreciated that system 1000 is represented as including functional blocks, which can be functional blocks that represent functions implemented by a computing platform, processor, software, or combination thereof (e.g., firmware). System 1000 includes a logical grouping 1002 of electrical components that can act in conjunction. For instance, logical grouping 1002 can include an electrical component for determining a half duplex schedule of performing non-simultaneous receiving and transmitting by a relay with an access node 1004. Moreover, logical grouping 1002 can include an electrical component for determining a physical random access channel configuration having a random access channel occasion that coincides with the half duplex schedule 1006. For another instance, logical grouping 1002 can include an electrical component for performing a random access channel procedure with the access node via the relay by using the physical random access channel configuration 1008. Additionally, system 1000 can include a memory 1020 that retains instructions for executing functions associated with electrical components 1004-1008. While shown as being external to memory 1020, it is to be understood that one or more of electrical components 1004-1008 can exist within memory 1020.

Figure 11:
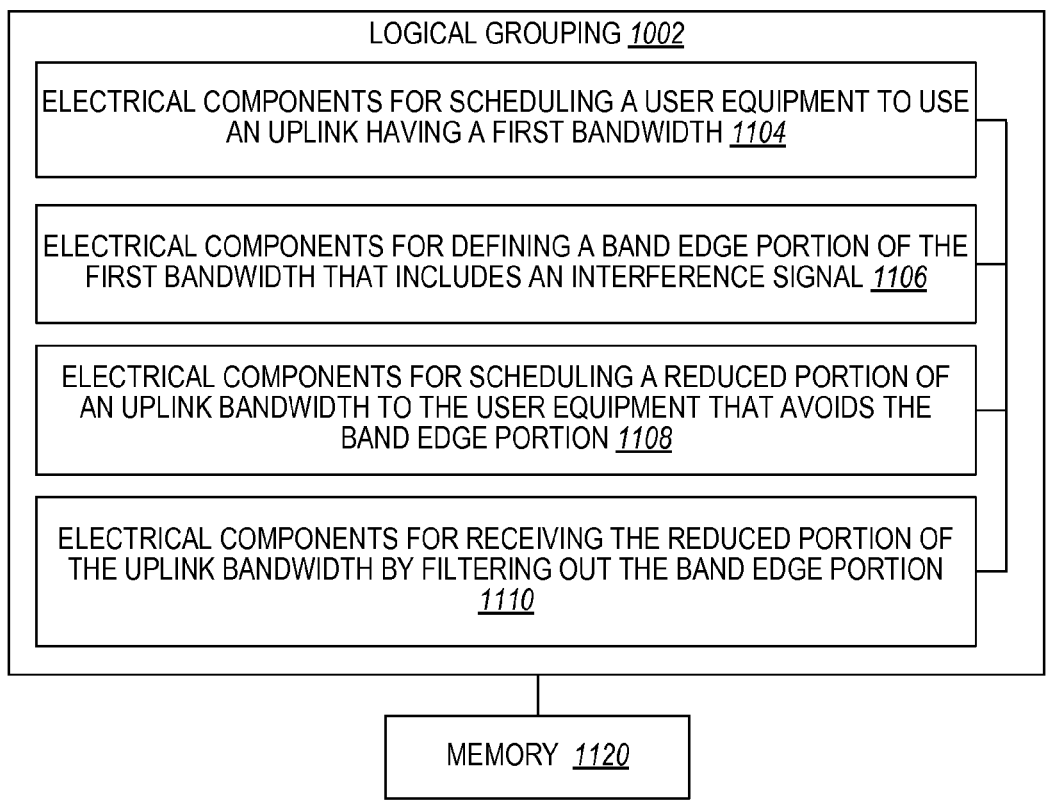
FIG. 11 illustrates a block diagram of a logical grouping of electrical components for interference mitigation in a heterogeneous wireless communication system that is incorporated at least in part in a node.

With reference to FIG. 11, illustrated is a system 1100 for interference mitigation in a wireless communication system. For example, system 1100 can reside at least partially within user equipment (UE). It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component for scheduling a user equipment to use an uplink having a first bandwidth 1104. Moreover, logical grouping 1102 can include an electrical component for defining a band edge portion of the first bandwidth that includes an interference signal 1106. For another instance, logical grouping 1102 can include an electrical component for scheduling a reduced portion of an uplink bandwidth to the user equipment that avoids the band edge portion 1108. For an additional instance, logical grouping 1102 can include an electrical component for receiving the reduced portion of the uplink bandwidth by filtering out the band edge portion 1110. Additionally, system 1100 can include a memory 1120 that retains instructions for executing functions associated with electrical components 1104-1110. While shown as being external to memory 1120, it is to be understood that one or more of electrical components 1104-1110 can exist within memory 1120.

In FIG. 12, an apparatus 1202 is depicted for interference mitigation in a wireless communication system. Means 1204 are provided for determining a half duplex schedule of performing non-simultaneous receiving and transmitting by a relay with an access node. Means 1206 are provided for determining a physical random access channel configuration having a random access channel occasion that coincides with the half duplex schedule. Means 1208 are provided for performing a random access channel procedure with the access node via the relay by using the physical random access channel configuration.

In FIG. 13, an apparatus 1302 is depicted for interference mitigation in a heterogeneous wireless communication system. Means 1304 are provided for scheduling a user equipment to use an uplink having a first bandwidth. Means 1306 are provided for defining a band edge portion of the first bandwidth that includes an interference signal. Means 1308 are provided for scheduling a reduced portion of an uplink bandwidth to the user equipment that avoids the band edge portion. Means 1310 are provided for receiving the reduced portion of the uplink bandwidth by filtering out the band edge portion.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like.

It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for interference mitigation in a wireless communication system at a base station, the method comprising:
    advertising an uplink bandwidth;
    identifying that a band edge portion of the uplink bandwidth includes an interfering signal of an interfering user equipment (UE);
    scheduling a served UE to use a reduced uplink bandwidth that avoids the band edge portion based on the identifying;
    receiving a transmission from the served UE in the reduced uplink bandwidth; and
    filtering out the band edge portion.

2. The method of claim 1, further comprising scheduling the served UE to use the advertised uplink bandwidth in response to detecting an absence of the interfering signal.

3. The method of claim 1, wherein scheduling the served UE to use the reduced uplink bandwidth comprises scheduling the served UE to transmit the uplink control channel closer to the center of the advertised bandwidth.

4. The method of claim 1, further comprising determining there are no uplink (UL) blank subframes defined, wherein the UL blank subframes are subframes to orthogonalize transmissions on a UL by interfering UEs and served UEs.

5. The method of claim 4, wherein the determining comprises:
    accessing a downlink frame structure, the downlink frame structure being capable of identifying a plurality of downlink subframes that have a blank portion; and determining an uplink frame structure based on the downlink frame structure.

6. The method of claim 4, wherein the determining comprises accessing an explicit uplink subframe definition.

7. The method of claim 4, wherein the determining comprises deriving the uplink subframe definition.

8. The method of claim 1, further comprising authenticating the served UE on a closed subscription group cell.

9. The method of claim 1, wherein the filtering comprises:
performing analog-to-digital sampling of a received signal sufficient to separate the band edge portion from the reduced portion; and
changing digital filter coefficients to attenuate the band edge portion.

10. The method of claim 1, wherein the filtering comprises analog filtering.

11. A non-transitory computer readable medium comprising code for causing at least one processor to:
advertise an uplink bandwidth;
identify that a band edge portion of the uplink bandwidth includes an interfering signal of an interfering user equipment (UE);
schedule a served UE to use a reduced uplink bandwidth that avoids the band edge portion based on the identifying;
receive a transmission from the served UE in the reduced uplink bandwidth; and
filter out the band edge portion.

12. An apparatus for interference mitigation in a wireless communication system, the apparatus comprising:
means for advertising an uplink bandwidth;
means for identifying that a band edge portion of the uplink bandwidth includes an interfering signal of an interfering user equipment (UE);
means for scheduling a served UE to use a reduced uplink bandwidth that avoids the band edge portion based on the identifying;
means for receiving a transmission from the served UE in the reduced uplink bandwidth; and
means for filtering out the band edge portion.

13. An apparatus for interference mitigation in a wireless communication system, the apparatus comprising:
a transmitter;
a scheduler for scheduling a served user equipment (UE) via the transmitter to use an uplink having an uplink bandwidth in a frame;
a computing platform for:
advertising the uplink bandwidth;
identifying that a band edge portion of the uplink bandwidth includes an interfering signal of an interfering UE;
the scheduler further for scheduling the served UE to use a reduced uplink bandwidth that avoids the band edge portion based on the identifying; and
a receiver for:
receiving a transmission from the served UE in the reduced uplink bandwidth, and
filtering out the band edge portion.

14. The apparatus of claim 13, wherein the scheduler is further for scheduling the served UE to use the advertised uplink bandwidth in response to detecting an absence of the interfering signal.

15. The apparatus of claim 13, wherein the scheduling the served UE to use the reduced uplink bandwidth comprises scheduling the served UE to transmit the uplink control channel closer to the center of the advertised bandwidth.

16. The apparatus of claim 13, wherein the computing platform is further for determining there are no uplink (UL) blank subframes defined, wherein the UL blank subframes are subframes to orthogonalize transmissions on a UL by interfering UEs and served UEs.

17. The apparatus of claim 16, wherein the determining comprises:
accessing a downlink frame structure, the downlink frame structure being capable of identifying a plurality of downlink subframes that have a blank portion; and
determining an uplink frame structure based on the downlink frame structure.

18. The apparatus of claim 16, wherein the determining comprises accessing an explicit uplink subframe definition.

19. The apparatus of claim 16, wherein the determining comprises deriving the uplink subframe definition.

20. The apparatus of claim 13, wherein the computing platform is further for authenticating the served UE on a closed subscription group cell.

21. The apparatus of claim 13, wherein the filtering comprises,
performing analog-to-digital sampling of a received signal sufficient to separate the band edge portion from the reduced portion; and
changing digital filter coefficients to attenuate the band edge portion.

22. The apparatus of claim 13, wherein the filtering comprises analog filtering.

* * * * *